(12) United States Patent
Jin et al.

(10) Patent No.: US 12,733,580 B2
(45) Date of Patent: Sep. 15, 2026

(54) DUAL-CHANNEL COMBINE HARVESTER SUITABLE FOR STRIP-LIKE COMPOUND PLANTED SOYBEANS AND CORNS AND METHOD THEREOF

(71) Applicants: Nanjing Institute of Agricultural Mechanization, Ministry of Agriculture and Rural Affairs, Nanjing (CN); Hubei Shuangxing Intelligent Equipment Co., Ltd., Shiyan City (CN)

(72) Inventors: Chengqian Jin, Nanjing (CN); Youliang Ni, Nanjing (CN); Yuanyang Wang, Nanjing (CN); Jinshan Xu, Nanjing (CN); Zhengjiang Li, Nanjing (CN); Liming Du, Nanjing (CN); Kun Chen, Nanjing (CN); Junfu Jiang, Nanjing (CN)

(73) Assignees: Nanjing Institute of Agricultural Mechanization, Ministry of Agriculture and Rural Affairs, Nanjing (CN); Hubei Shuangxing Intelligent Equipment Co., Ltd., Shiyan City (CN)

( * ) Notice: Subject to any disclaimer, the term of this patent is extended or adjusted under 35 U.S.C. 154(b) by 340 days.

(21) Appl. No.: 18/397,421

(22) Filed: Dec. 27, 2023

(65) Prior Publication Data

US 2024/0260510 A1 Aug. 8, 2024

(30) Foreign Application Priority Data

Feb. 7, 2023 (CN) ........................ 202310074768.2

(51) Int. Cl.
*A01D 41/14* (2006.01)
*A01D 45/02* (2006.01)
*A01D 45/22* (2006.01)

(52) U.S. Cl.
CPC ............. *A01D 41/14* (2013.01); *A01D 45/02* (2013.01); *A01D 45/22* (2013.01)

(58) Field of Classification Search
CPC .... A01D 41/14; A01D 41/144; A01D 45/021; A01D 45/028; A01D 45/22
See application file for complete search history.

(56) References Cited

U.S. PATENT DOCUMENTS 434,702 A * 8/1890 Cooley et al. ......... B65G 47/00 222/56
2,430,669 A * 11/1947 Crowley, Jr. .............. B01J 8/12 422/216

(Continued)

FOREIGN PATENT DOCUMENTS

CN 21698260 U 7/2022

*Primary Examiner* — Cathleen R Hutchins
(74) *Attorney, Agent, or Firm* — Suiter Swantz IP

(57) ABSTRACT

A dual-channel combine harvester suitable for strip-like compound planted soybeans and corns and a method thereof are provided. The combine harvester includes a mobile harvester body and a combine cutting table portion installed on the mobile harvester body. The combine cutting table portion include a main bracket which is provided with a soybean cutting table and a corn picking table. The main bracket is rotatably installed on the mobile harvester body, and a first angle adjusting mechanism is installed between the main bracket and the mobile harvester body. The soybean cutting table is provided with a first bracket fixed with respect to the main bracket. The corn picking table includes a second bracket which is rotatably installed with respect to the main bracket, and a second angle adjusting mechanism (Continued)

is arranged between the second bracket and the main bracket.

7 Claims, 11 Drawing Sheets

(56) References Cited

U.S. PATENT DOCUMENTS

| | | | | |
|---|---|---|---|---|
| 3,468,107 | A * | 9/1969 | Van Der Lely | A01D 41/144 56/16.2 |
| 3,669,124 | A * | 6/1972 | De Coene | A01D 41/1252 460/59 |
| 4,409,780 | A * | 10/1983 | Beougher | A01B 73/02 56/228 |
| 10,321,628 | B2 * | 6/2019 | Borry | A01D 47/00 |
| 2012/0042621 | A1 * | 2/2012 | Lohrentz | A01D 45/021 56/109 |

* cited by examiner

DUAL-CHANNEL COMBINE HARVESTER SUITABLE FOR STRIP-LIKE COMPOUND PLANTED SOYBEANS AND CORNS AND METHOD THEREOF

CROSS-REFERENCE TO RELATED APPLICATION

This patent application claims the benefit and priority of Chinese Patent Application No. 202310074768.2, entitled "DUAL-CHANNEL COMBINE HARVESTER SUITABLE FOR STRIP-LIKE COMPOUND PLANTED SOYBEANS AND CORNS AND METHOD THEREOF" filed on Feb. 7, 2023, the disclosure of which is incorporated by reference herein in its entirety as portion of the present application.

TECHNICAL FIELD

The present disclosure relates to the technical field of agricultural harvesting, in particular to a dual-channel combine harvester suitable for strip-like compound planted soybeans and corns and a method thereof.

BACKGROUND

A soybean and corn strip compound planting technology utilizes the edge advantage of high crops to increase the multiple cropping index of land, expand the space of low crops, achieve the harmonious coexistence of high and low crops, achieve double harvest in one season and improve the grain and oil output. The soybean and corn strip compound planting technology increases the supply of high-quality edible soybean without reducing grain, and solves the contradiction between the soybeans and the corns for land. It is of great significance to implement soybean and corn strip compound planting to improve the comprehensive production capacity of national grain and oil and accelerate the construction of the food security system of China.

At present, the crops are harvested under the strip-like compound planted mode of the soybeans and corns utilize the way of dividing crops and harvesting separately step by step by the existing soybean and corn combine harvester. The existing harvesters have poor adaptability to the production mode, and have problems such as poor operation quality, insufficient production capacity and low operation efficiency. In actual production, there is a serious shortage of harvesting equipments suitable for the strip-like compound planted mode of the soybeans and corns, so that it is urgent to develop suitable and efficient harvesting devices, improve the overall income of the planting mode, improve the enthusiasm of farmers, and provide technical and equipment support for the popularization and application of the planting mode.

If soybean and corn can be harvested at the same time under the strip-like compound planted mode of the soybeans and corns, the operation efficiency can be greatly improved, and the economic benefit of the planting mode can be improved. However, at present, an integrated combine harvester which can harvest soybean and corn at the same time has not been reported, and there is no such model in the market.

Take the compound planted mode of "two rows of corns and four rows of soybeans" with the largest popularization area as an example. At present, the narrow grain harvester is mainly used to harvest the four rows of soybeans at a time, and the small corn harvester harvests the two rows of corns at a time. The soybeans and the corns are harvested separately and step by step. When harvesting a single type of the crop, it is inconvenient to turn around in the field, the harvesting efficiency is low, the procedures are complicated, and the cost of harvesting operation is greatly improved, which directly affects the overall benefit of the soybean and corn compound planted mode. Aiming at the compound planted mode of "two rows of corns and four rows of soybeans", the present disclosure designs a dual-channel soybean-corn combine harvester, which can achieve the simultaneous one-time harvesting operation of two rows of corns and four rows of soybeans.

In the prior art, the Chinese patent with the application number of 202220851421.5 proposes an integrated soybean and corn combine harvester, which discloses the innovation of simultaneous harvesting operation of soybeans and corns. However, the applicant found in continuous practice that in a cutting table with an integrated auger proposed in the above patent, blades with opposite rotation directions are installed on an integrated auger to achieve the transportation of soybeans and corns. Because the planting densities of the soybeans and the corns and the crop yields are different, the phenomenon of the corn plants staying on the cutting table and serious corn damage exists in the constant speed transportation of the integrated auger. Because the cutting table auger is an integrated structure, the soybean cutting table and the corn cutting table are simply assembled together, and soybean reels and a corn separator are basically in the same plane, which will cause soybean loss at harvest. In the layout of granaries, soybean and corn granaries are arranged from front to back, the overall harvester length is too long, and the center of gravity is unstable.

The embodiments aim to solve the following technical problems.

(1) The integrated cutting table cannot adapt to the actual situation of soybeans and corns for harvesting, which easily leads to a high loss rate.

(2) The cutting tables corresponding to the soybean and corn crops will affect each other, so that the fruits harvested by the two cutting tables are mixed with each other;

(3) When corn ear enters the corn grain tank, the corn will be damaged because the corn grain tank is deep.

(4) The harvesting method is unreasonable, and the harvester needs to be frequently manipulated to turn around, so that the efficiency is low.

The following embodiments will focus on the technical problem above-mentioned in (1) as the main technical problem.

SUMMARY

The embodiments aim to overcome the shortcomings in the prior art, a dual-channel combine harvester suitable for strip-like compound planted soybeans and corns and a method thereof are provided, aiming at enabling the cutting table corresponding to soybean and corn crops to be adjusted at an angle in a large range as a whole, and enabling the two cutting tables to be adjusted in height according to the actual conditions of their respective crops.

Technical solution: in order to achieve the above purpose, the present disclosure provides a dual-channel combine harvester suitable for strip-like compound planted soybeans and corns, which includes a mobile harvester body and a combine cutting table portion installed on the mobile harvester body.

The combine cutting table portion comprises a main bracket; the main bracket is provided with a soybean cutting table and a corn picking table. The corn picking table is connected with a corn grain tank through a corn conveying device. The soybean cutting table is connected with a soybean grain tank through a soybean conveying device.

The main bracket is rotatably installed on the mobile harvester body, and a first angle adjusting mechanism is installed between the main bracket and the mobile harvester body.

The soybean cutting table is provided with a first bracket fixed with respect to the main bracket.

The corn picking table comprises a second bracket; the second bracket is rotatably installed with respect to the main bracket, and a second angle adjusting mechanism is arranged between the second bracket and the main bracket.

Further, the corn picking table may be configured to be disposed backwardly and upwardly with respect to the soybean cutting table.

Further, the corn grain tank and the soybean grain tank may be arranged from left to right.

Further, the soybean cutting table may include reels and a transverse soybean conveying auger, and the soybean conveying auger may be connected with the soybean conveying device.

Further, the corn picking table may include two picking devices. Each picking devices may include two roller bodies one of which may be an auxiliary feeding roller and the other may be a stalk pulling roller. The two roller bodies may be rotatably installed on the second bracket and arranged in parallel with each other. A channel into which corn stalks enter may be formed between the two roller bodies. Pulling wheels may be installed at a front end of the channel. A corn ear conveying auger transversely arranged may be installed below a rear side of the channel. A straw chopping roller may be further installed below the picking device.

The two roller bodies included in each picking device may be connected with a same transmission box which may drive the two roller bodies to rotate reversely at a constant speed and may be driven to rotate by a hydraulic motor.

Further, a corn buffer device may be installed in the corn grain tank and may include a base plate. A buffer plate may be installed on the base plate. Buffer springs may be installed between the buffer plate and the base plate.

Further, the corn buffer device may further include a seat plate, a first hinged seat installed on the seat plate, and a second hinged seat installed on the base plate. A pneumatic telescopic rod may be connected between the first hinged seat and the second hinged seat. The base plate may be rotatably installed with respect to the seat plate.

Further, the seat plate may be capable of lifting and sliding with respect to the corn grain tank, and a slide guide device may be arranged between the seat plate and the corn grain tank.

A driving mechanism may be further arranged between the corn buffer device and the corn grain tank and may include a gear, a rack, a gear shaft and a one-way clutch. The gear and the rack may be meshed with each other and may be rotatably installed with respect to the seat plate and the base plate, respectively. The one-way clutch may be installed between the gear and the gear shaft. The driving mechanism further may include a lead screw installed in the corn grain tank and a lead screw nut rotatably installed on the seat plate. A transmission relationship may be established between the gear shaft and the lead screw nut through a bevel gear set.

Further, the soybean grain tank may include a square main box and grain discharge ports located below the square main box. Each grain discharge port may be a four-sided cone, angles of repose of left and right sides of the grain discharge port may be $\alpha_1$, and angles of repose of front and rear sides of the grain discharge port may be $\alpha_2$ and $\alpha_3$, respectively; $\alpha_1=135°$, $\alpha_2=135°$, and $\alpha_3=72°$.

A dual-channel combine harvesting method suitable for soybean and corn strip compound planting is provided, including:

operating a combine harvester to carry out a plurality of rounds of cyclic harvesting operations on a current operation area, wherein in each of the plurality of rounds of harvesting operations, a combine harvester firstly harvests soybean and corn crop combination at one end of remaining crops in the current operation area, and harvests soybean and corn crop combination at an other end of the remaining crops;

wherein when the remaining crops are incapable of forming a complete soybean and corn crop combination, harvesting the remaining crops by using a corresponding cutting table in a combine cutting table portion according to types of crops.

Beneficial effects: the dual-channel combine harvester suitable for strip-like compound planted soybeans and corns and the method thereof according to the embodiments have the following beneficial effects.

(1) The whole combine cutting table portion can be lifted in a large range through the first angle adjusting mechanism, which is convenient for the control and transportation of a harvest height. The corn picking table is connected to the main bracket through the second angle adjusting mechanism, and the lifting can be controlled independently, thus solving the problem in the prior art that the soybean cutting table and the corn picking table operate synchronously, and it is difficult to adapt to the actual situation in real time. Moreover, it is more convenient to control compared with the solution of independently controlling the lifting of two types of cutting tables (a soybean cutting table and a corn picking table).

(2) The corn picking table is configured to be disposed backwardly and upwardly with respect to the soybean cutting table, so that the mutual influence of the two cutting tables can be reduced.

(3) By providing the corn buffer device, the corns entering the corn grain tank can be buffered to prevent the corn ears from being broken by impact. Moreover, the corn buffer device can rise with the increase of the number of corns in the corn grain tank, and cannot be buried by corns, which can always play a buffering role.

(4) The harvesting path planning is reasonable, and the harvester does not need to turn around frequently, which can run smoothly and improve the harvesting efficiency.

Figure 1:
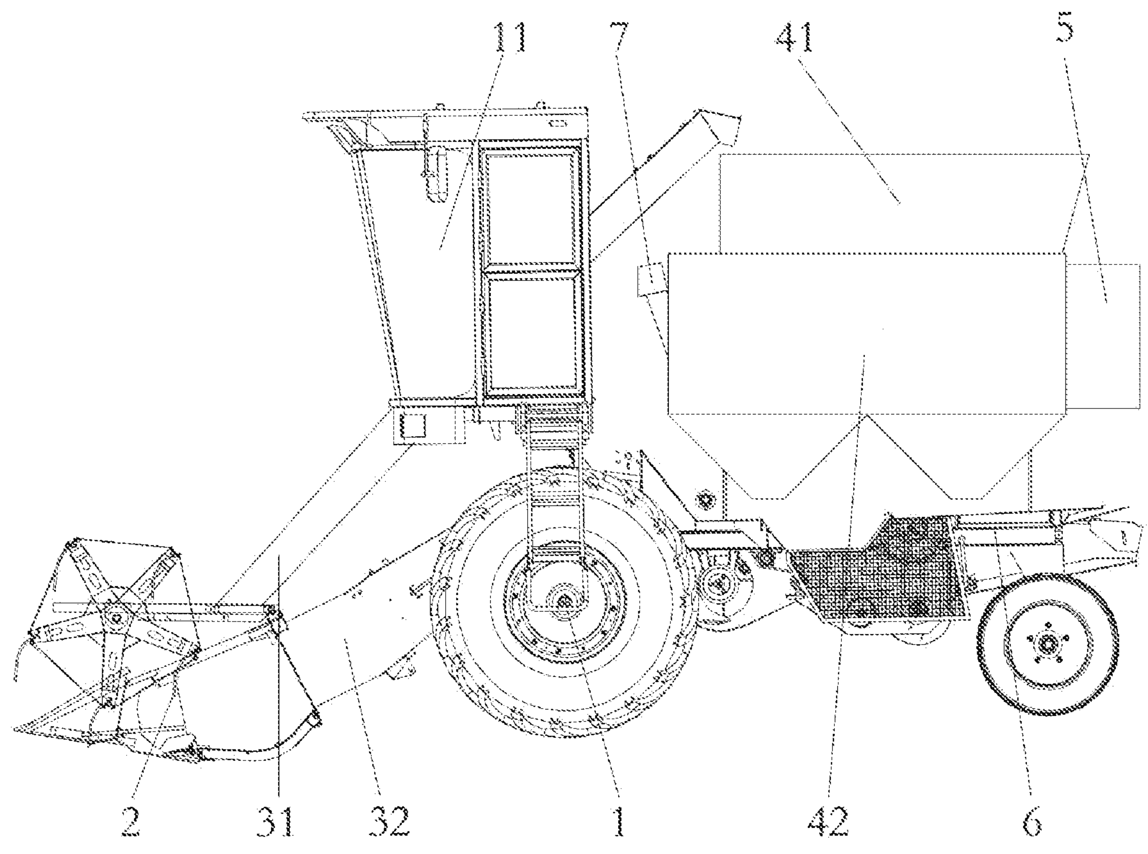
FIG. 1 is an overall structural diagram of a combine harvester.

List of the reference characters: 1 moving harvester body; 11 cab; 2 combine cutting table portion; 21 main bracket; 22 soybean cutting table; 221 first bracket; 222 reel; 223 soybean conveying auger; 23 corn picking table; 231 second bracket; 232 stalk pulling roller; 233 pulling wheel; 234 corn ear conveying auger; 235 straw chopping roller; 236 transmission box; 237 hydraulic motor; 238 grain separator; 239 auxiliary feeding roller; 230 main transmission box; 24 second angle adjusting mechanism; 31 corn conveying device; 32 soybean conveying device; 41 corn grain tank; 42 soybean grain tank; 421 main box; 422 grain discharge port; 43 corn buffer device; 431 base plate; 432 buffer plate; 433 buffer spring; 434 first hinged seat; 435 second hinged seat; 436 pneumatic telescopic rod; 437 seat plate; 44 slide guide device; 441 guide rod; 442 sliding sleeve; 45 drive mechanism; 451 gear; 452 rack; 453 gear shaft; 454 cage; 455 lead screw; 456 lead screw nut; 457 bevel gear set; 5 threshing device; 6 soybean cleaning device; and 7 soybean grain elevator.

DETAILED DESCRIPTION OF THE EMBODIMENTS

The present disclosure will be further described with reference to the attached drawings hereinafter.

Figure 2:
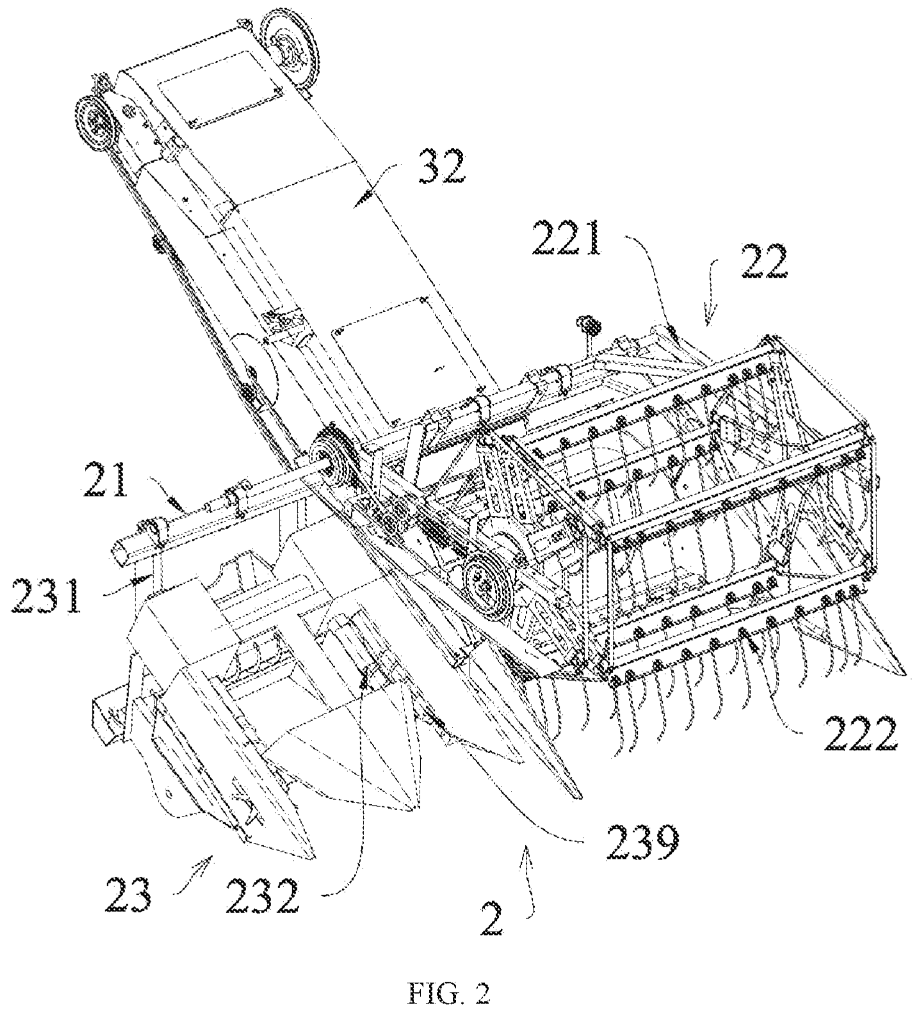
FIG. 2 is a structural diagram of a combine cutting table portion.

As shown in FIG. 1, a dual-channel combine harvester suitable for strip-like compound planted soybeans and corns is provided, which includes a mobile harvester body 1 and a combine cutting table portion 2 installed on the mobile harvester body 1. The mobile harvester body 1 is provided with a cab 11. As shown in FIG. 2, the combine cutting table portion 2 includes a main bracket 21. The main bracket 21 is provided with a soybean cutting table 22 and a corn picking table 23 which are connected with a corn grain tank 41 and a soybean grain tank 42 through a corn conveying device 31 and a soybean conveying device 32, respectively. Preferably, a soybean threshing device 5 and a soybean cleaning device 6 are arranged between the soybean conveying device 32 and the soybean grain tank 42. The soybean cutting table 22 and the corn picking table 23 are both arranged in a staggered manner from front to back and from top to bottom to avoid interference of soybeans and corns projects. The main bracket 21 is rotatably installed on the mobile harvester body 1, and a first angle adjusting mechanism 24 is installed between the main bracket and the mobile harvester body. The soybean cutting table 22 is provided with a first bracket 221 fixed with respect to the main bracket 21. The corn picking table 23 includes a second bracket 231. The second bracket 231 is rotatably installed with respect to the main bracket 21, and a second angle adjusting mechanism 24 is arranged between the second bracket and the main bracket.

The first angle adjusting mechanism 24 and the second angle adjusting mechanism 24 are oil cylinders. Compared with the prior art, in the present disclosure, the angle of the corn picking table 23 can be dynamically adjusted with respect to the main bracket 21 by providing the second angle adjusting mechanism 24. In this way, the problem in the prior art that it is difficult to adapt to the actual situation in real time due to the synchronous operation between the soybean cutting table and the corn picking table is solved. The whole combine cutting table portion 2 can be lifted in a large range through the first angle adjusting mechanism 24, which is convenient for the control and transportation of harvest height. The corn picking table 23 is connected to the main bracket 21 through the second angle adjusting mechanism 24, and the lifting can be controlled independently.

The corn picking table 23 is configured to be disposed backwardly and upwardly with respect to the soybean cutting table 22, so that corn grains can be prevented from entering the soybean harvesting system.

The corn grain tank 41 and the soybean grain tank 42 are arranged from left to right. In this way, the overall length of the harvester can be effectively shortened, and the center of gravity of the harvester can be stabilized. In contrast, in the prior art, soybean and corn granaries are generally arranged from front to back, the overall harvester length is too long, and the center of gravity is unstable.

Figure 3:
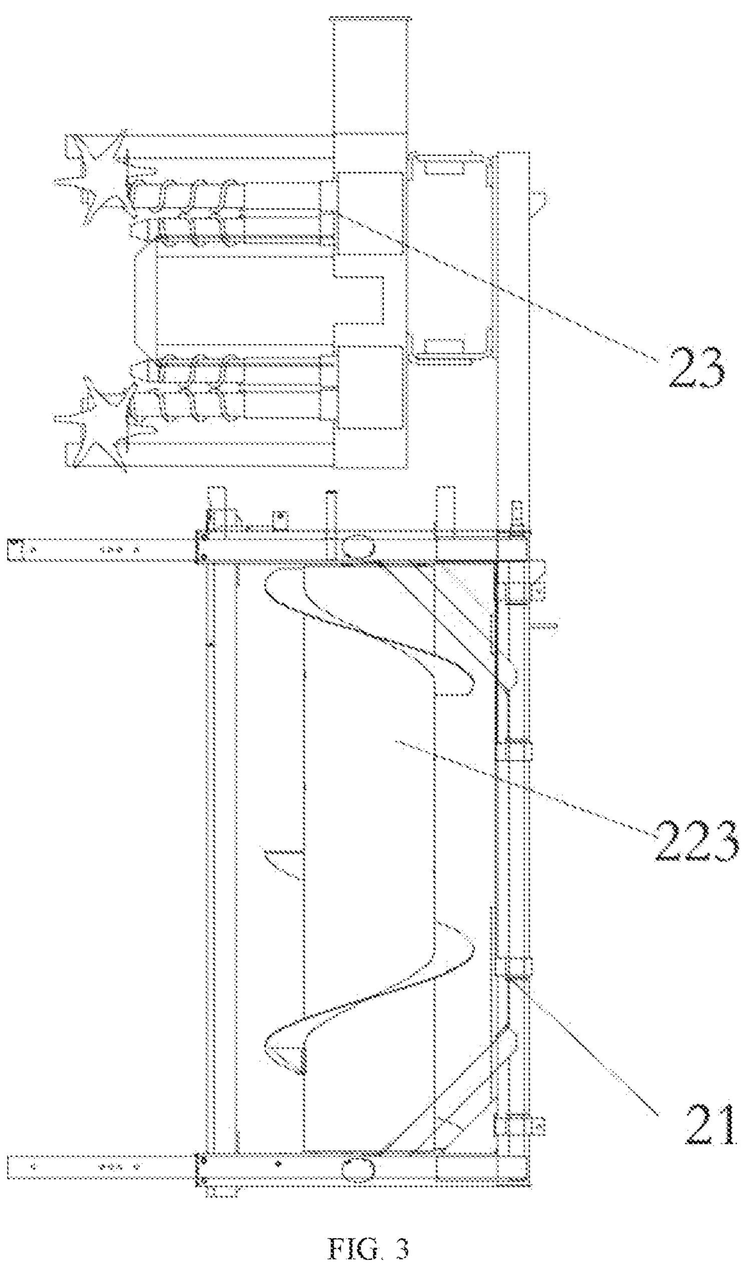
FIG. 3 is a top diagram of the combine cutting table (without the reels).

Preferably, the soybean cutting table 22 includes reels 222 and a transverse soybean conveying auger 223 (as shown in FIG. 3), and the soybean conveying auger 223 is connected with the soybean conveying device 32. The soybean cutting table 22 is a narrow cutting table, which is suitable for harvesting four rows of soybeans with a row spacing of 30 cm. The bottom plate of the cutting table is hollowed to prevent soil from entering the cutting table, and the grain separator far from the corn picking table 23 adopts a large-angle vertical push-out grain separator to avoid the influence of harvesting soybeans on adjacent corns.

Figure 4:
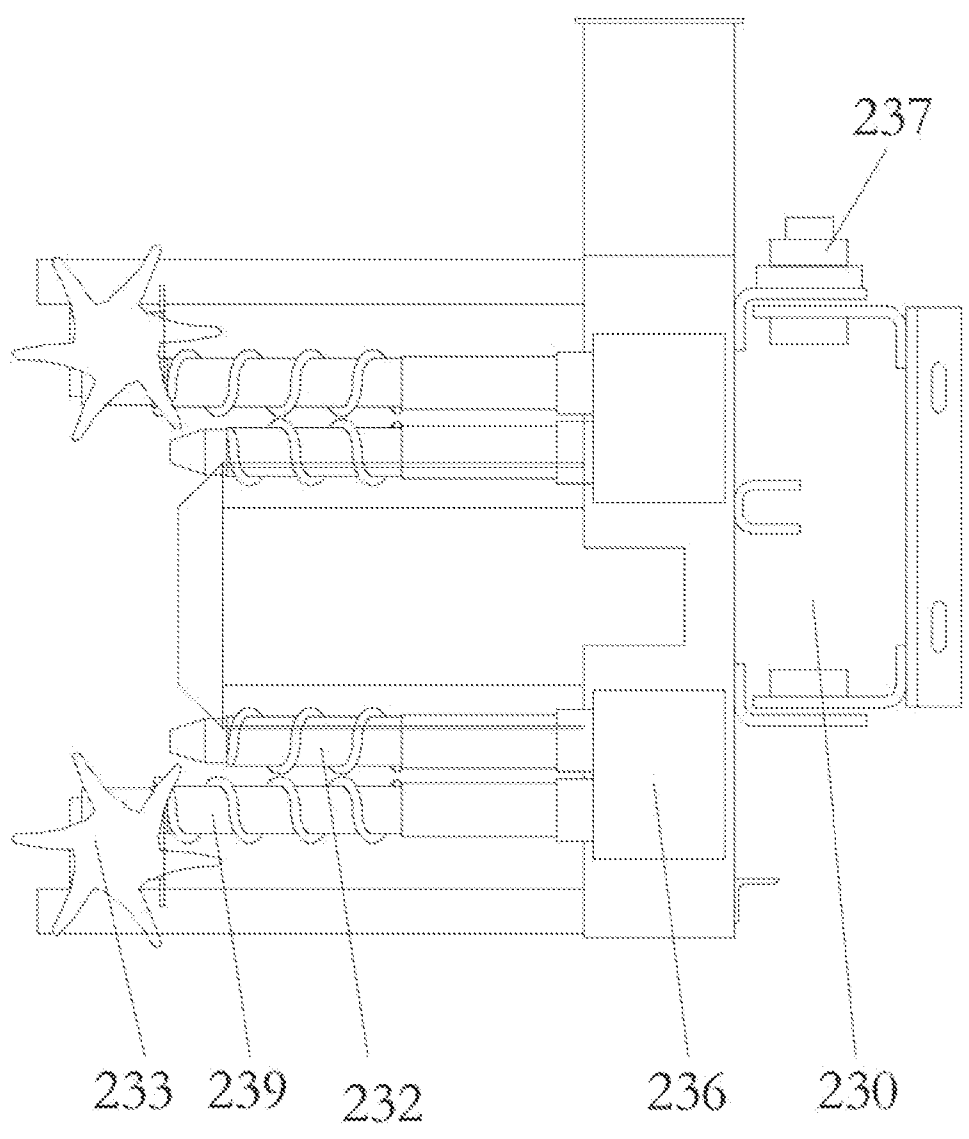
FIG. 4 is a top structural diagram of a corn picking table.
Figure 5:
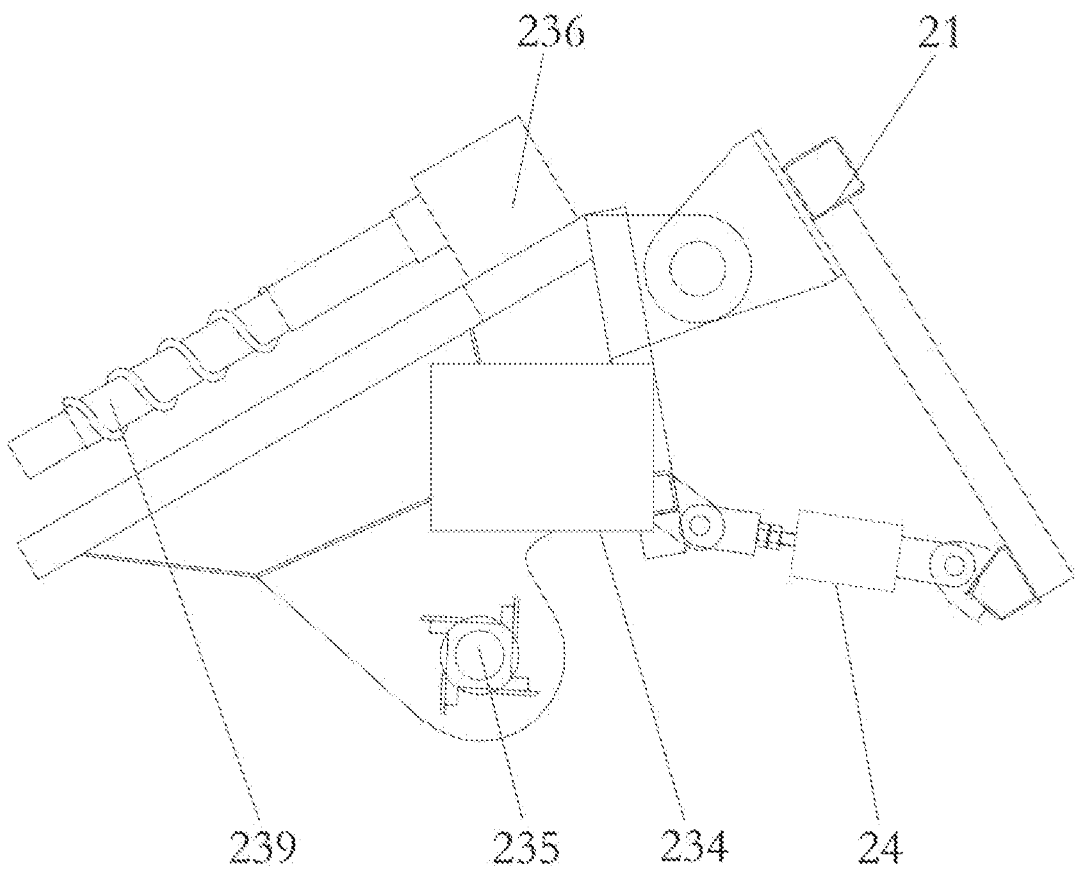
FIG. 5 is a side structural diagram of the corn picking table.

Preferably, as shown in FIG. 4 to FIG. 5, the corn picking table 23 includes two picking devices; each picking devices includes two roller bodies one of which is an auxiliary feeding roller 239 and the other is a stalk pulling roller 232, and the two roller bodies rotatably installed on the second bracket 231 and arranged in parallel with each other. The two roller bodies are provided with spiral protrusions, the rotation directions of the spiral protrusions on the two rollers are opposite, and a channel into which corn stalks enter is formed between the two roller bodies. Pulling wheels 233 and a grain separator 238 are installed at a front end of the channel, a corn ear conveying auger 234 transversely arranged is installed below a rear side of the channel, the corn ear conveying auger 234 is connected with the corn conveying device 31, and a straw chopping roller 235 is further installed below the picking device.

The two roller bodies included in each picking devices are connected with a same transmission box 236 which drives the two roller bodies to rotate reversely at a constant speed and is driven to rotate by a hydraulic motor 237. The hydraulic motor 237 transmits power to the transmission box 236 through the main transmission box 230. The corn picking table 23 can harvest two rows of corn with row spacing of 30-60 cm at the same time, and the grain separator 238 is a large-angle flip-over grain separator, which can ensure the smooth feeding of corns.

Figure 6:
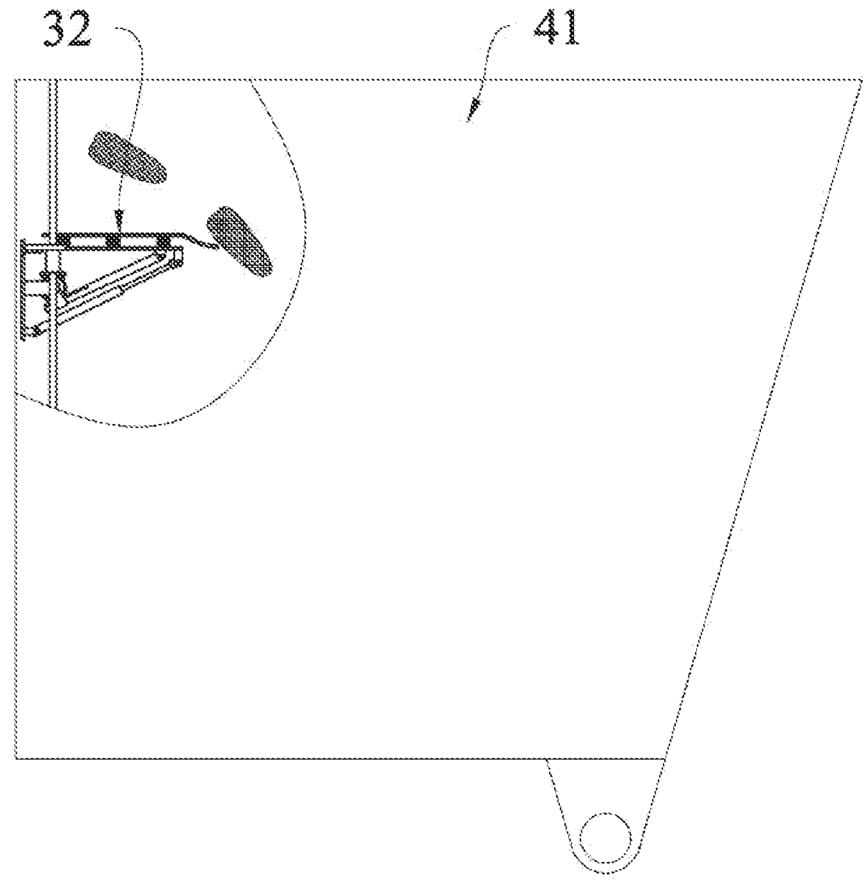
FIG. 6 is a structural diagram of a corn grain tank.
Figure 7:
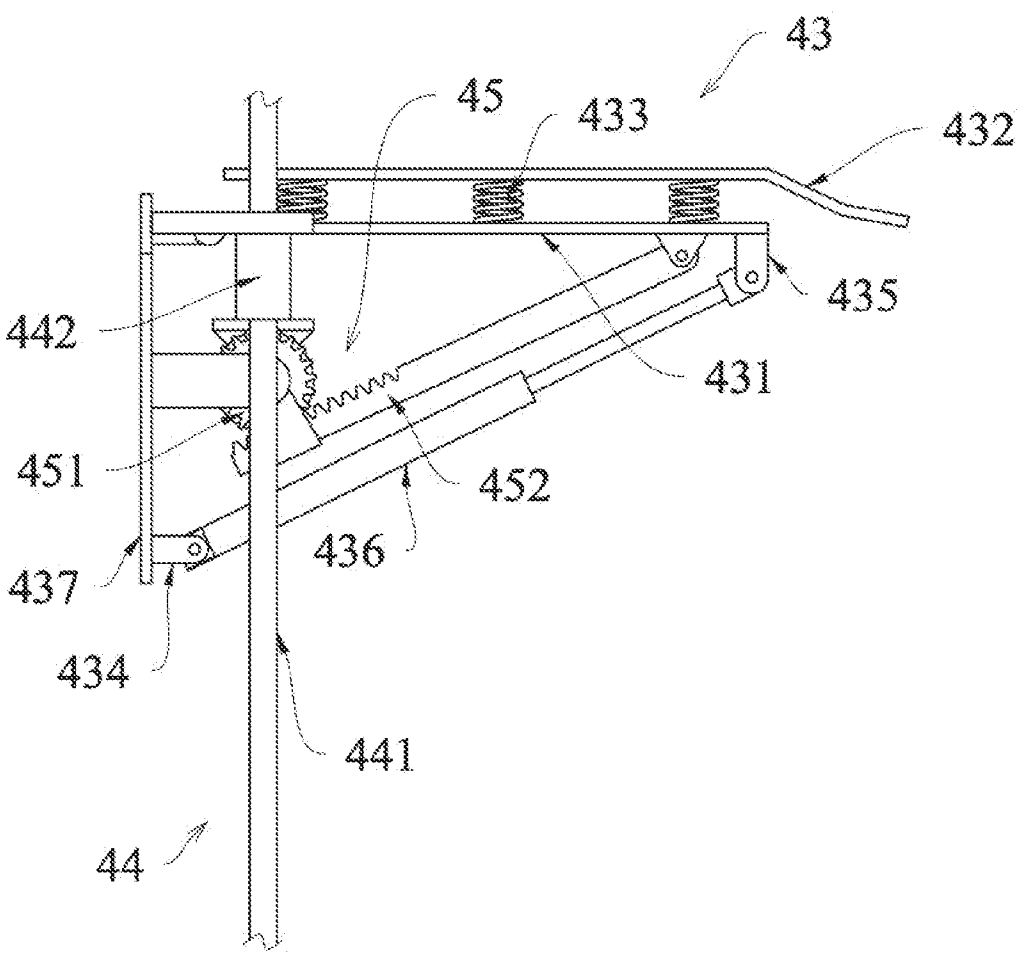
FIG. 7 is a side structural diagram of a corn buffer device.

Preferably, when the corn ear is thrown from the outlet of the corn conveying device 31 and falls into the corn grain tank 41, the corn ear will be accelerated by gravity and hit the metal plate of the lower box or other corn ears, which will greatly damage the corns and affect the harvest quality of corns. In order to solve the above problems, as shown in FIG. 6, a corn buffer device 43 is installed in the corn grain tank 41. As shown in FIG. 7, the corn buffer device 43 includes a base plate 431. A buffer plate 432 is installed on the base plate 431, buffer springs 433 are installed between the buffer plate and the base plate, and the buffer plate 432 is a rubber plate.

The corn buffer device 43 further includes a seat plate 437, a first hinged seat 434 installed on the seat plate 437, and a second hinged seat 435 installed on the base plate 431, a pneumatic telescopic rod 436 is connected between the two hinged seats, both ends of the pneumatic telescopic rod 436 are hinged with the two hinged seats. The base plate 431 is rotatably installed with respect to the seat plate 437. In the above corn buffer device 43, the elastic action of the buffer springs 433 and the buffer plate 432 forms a first layer of buffer, and the buffering action of the pneumatic telescopic rod 436 forms a second layer of buffer, which can effectively absorb the kinetic energy of moving objects and achieve rapid deceleration. In this way, after the corn ears are thrown out, the corn ears are decelerated through the corn buffer device 43 in the falling process, and the corn ears can gently fall to the bottom of the grain tank at a lower speed, thus reducing the breakage resulted from the corn collection process. In addition, the corn grain tank 41 is rotatably installed with respect to the mobile harvester body 1, the corn grain tank can be turned over with respect to the mobile harvester body 1 to unload the corn ears therein, and an actuator such as an oil cylinder can be arranged between the corn grain tank 41 and the mobile harvester body 1 to achieve the self-turning of the corn grain tank 41.

Figure 8:
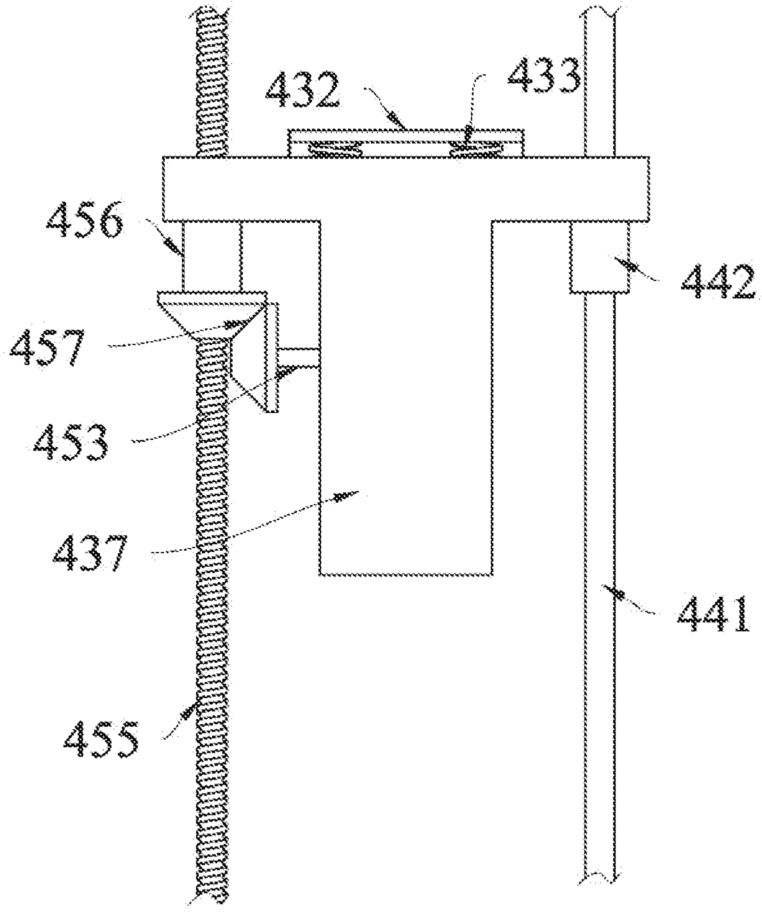
FIG. 8 is a rear structural diagram of the corn buffer device.
Figure 9:
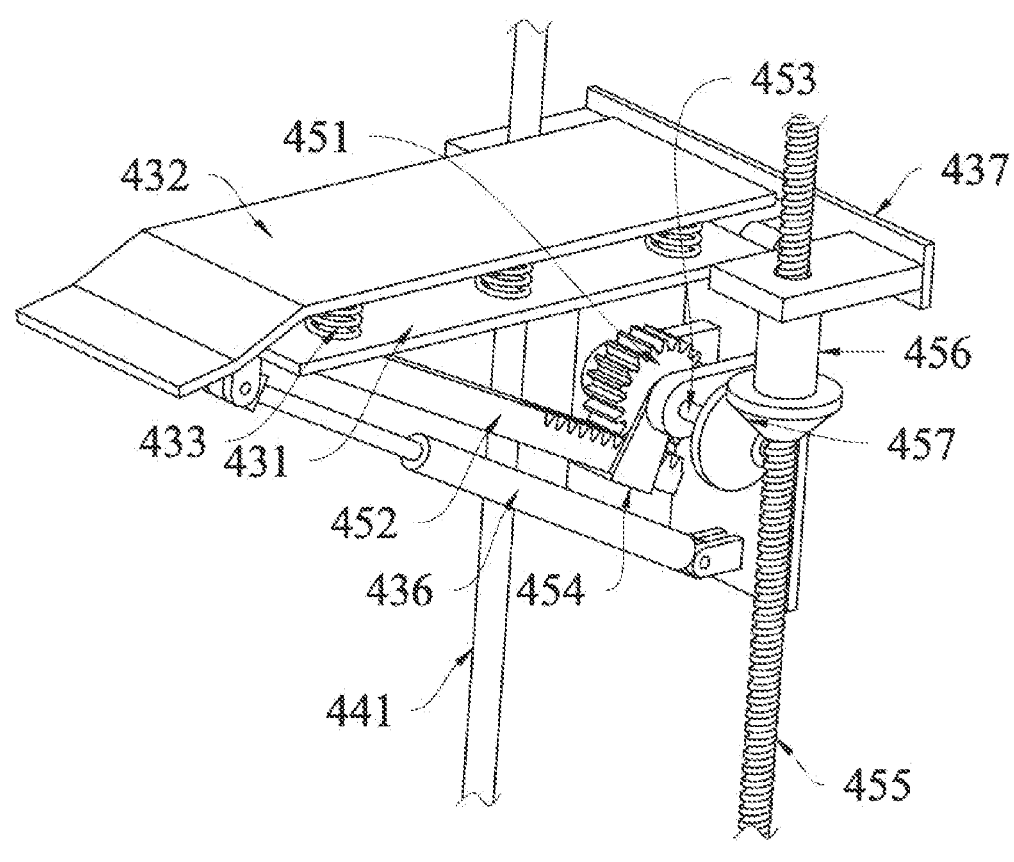
FIG. 9 is a perspective structural diagram of the corn buffer device.

Preferably, as shown in FIG. 7 to FIG. 9, the seat plate 437 is capable of lifting and sliding with respect to the corn grain tank 41, and a slide guide device 44 is arranged between the seat plate and the corn grain tank. The slide guide device 44 includes a guide rod 441 fixed with respect to the corn grain tank 41 and a sliding sleeve 442 installed on the seat plate 437.

A driving mechanism 45 is further arranged between the corn buffer device 43 and the corn grain tank 41. The driving mechanism 45 includes a gear 451, a rack 452, a gear shaft 453 and a one-way clutch. The gear 451 and the rack 452 are meshed with each other and are rotatably installed with respect to the seat plate 437 and the base plate 431, respectively. The seat plate 437 is further provided with a cage 454 coaxially rotatably installed with the gear 451, and the cage 454 keeps the gear 451 and the rack 452 meshed with each other. The one-way clutch is installed between the gear 451 and the gear shaft 453. The driving mechanism 45 further includes a lead screw 455 installed in the corn grain tank 41 and a lead screw nut 456 rotatably installed on the seat plate 437. A transmission relationship is established between the gear shaft 453 and the lead screw nut 456 through a bevel gear set 457.

With the above structure, the corn buffer device 43 can gradually rise with the accumulation of corns in the corn grain tank 41 by the impact force of corns. The specific process is as follows.

Initially, the corn buffer device 43 is in a low position, and the lead screw 455 is locked and cannot rotate relative to the corn grain tank 41. When the corn ears fall into the corn grain tank 41, the corn ears impact the corn buffer device 43, and the pneumatic telescopic rod 436 expands and contracts, so that the rack 452 generate a relative movement with the gear 451. Under the action of the one-way clutch, in the process that the pneumatic telescopic rod 436 is compressed, the rack 452 rotates the gear 451, and the gear 451 rotates the gear shaft 453 through the one-way clutch, so as to drive the lead screw nut 456 to rotate with respect to the lead screw 455 and lift the corn buffer device 43. However, in the process that the pneumatic telescopic rod 436 resets the base plate 431 upward, the rotation of the gear 451 will not rotate the gear shaft 453, and the self-locking characteristic between the lead screw 455 and the lead screw nut 456 keeps the height of the corn buffer device 43 unchanged. In this way, as more and more corn ears enter the corn grain tank 41 through the corn buffer device 43, the position of the corn buffer device 43 may gradually rise. In this way, the corn buffer device 43 may be installed at a lower position in the initial state, so that the corns will not fall to the bottom of the tank after leaving the corn buffer device 43 for a long distance. In addition, the corn buffer device 43 may rise with the accumulation of corns in the tank to ensure the buffering effect. After the corns are poured out of the grain tank, the lead screw 455 may be unlocked and the lead screw nut 456 may be fixed with respect to the seat plate 437, so that the corn buffer device 43 may be lowered to the low position again by rotating the lead screw 455.

Preferably, the soybean grain tank 42 includes a square main box 421 and grain discharge ports 422 located below the main box 421. The grain discharge port 422 is a four-sided cone, angles of repose of left and right sides of the grain discharge port 422 are both $\alpha_1$, and angles of repose of front and rear sides of the grain discharge port 422 are $\alpha_2$ and $\alpha_3$, respectively. $\alpha_1=135°$, $\alpha_2=135°$, and $\alpha_3=72°$.

During the operation, the combine cutting table portion 2 harvests the soybeans and the corns at the same time. After four rows of the soybeans are harvested by the soybean cutting table 22, the harvested soybeans are conveyed to the soybean threshing device 5 via the soybean conveying device 32. After being threshed by the soybean threshing device 5, the soybean stalks are thrown out at the rear side of the threshing device 5, and the soybean grains and some impurities fall to the soybean cleaning device 6 for cleaning operation. The soybean cleaning device 6 is provided with a grain conveying auger and a soybean grain elevator. After the cleaning operation, the impurities are thrown out from the rear side of the soybean cleaning device 6, and the soybean grains enter the grain conveying auger and are conveyed to the soybean grain tank 42 by the soybean grain elevator 7, thus completing a series of operations of harvesting, threshing, cleaning and collecting the soybean portion. When the soybeans are harvested, two rows of the corns are harvested by the corn picking table 23, and the whole corns are pulled backward by the pulling wheel 233 and the auxiliary feeding roller 239. The corn ears are picked by the stalk pulling rollers 232 at both sides rotating reversely, and are collected by the corn ear conveying auger 234 and conveyed to the discharge port of the corn conveying device 31. At the same time, the corn stalks continuously move downward under the rotating force of the stalk pulling roller 232, and are crushed and returned to the field by the stalk chopping roller 235. The corn ears are collected by the corn ear conveying auger 234, are conveyed to the discharge port of the corn conveying device 31, fall onto the convey belt of the corn conveying device 31 under the action of gravity, are conveyed backwards, fall into the corn grain tank 41 at the corn throwing port, and finally fall into the grain tank at a lower speed by the deceleration of the corn buffer device in the process of falling into the corn grain tank 41.

Figure 10:
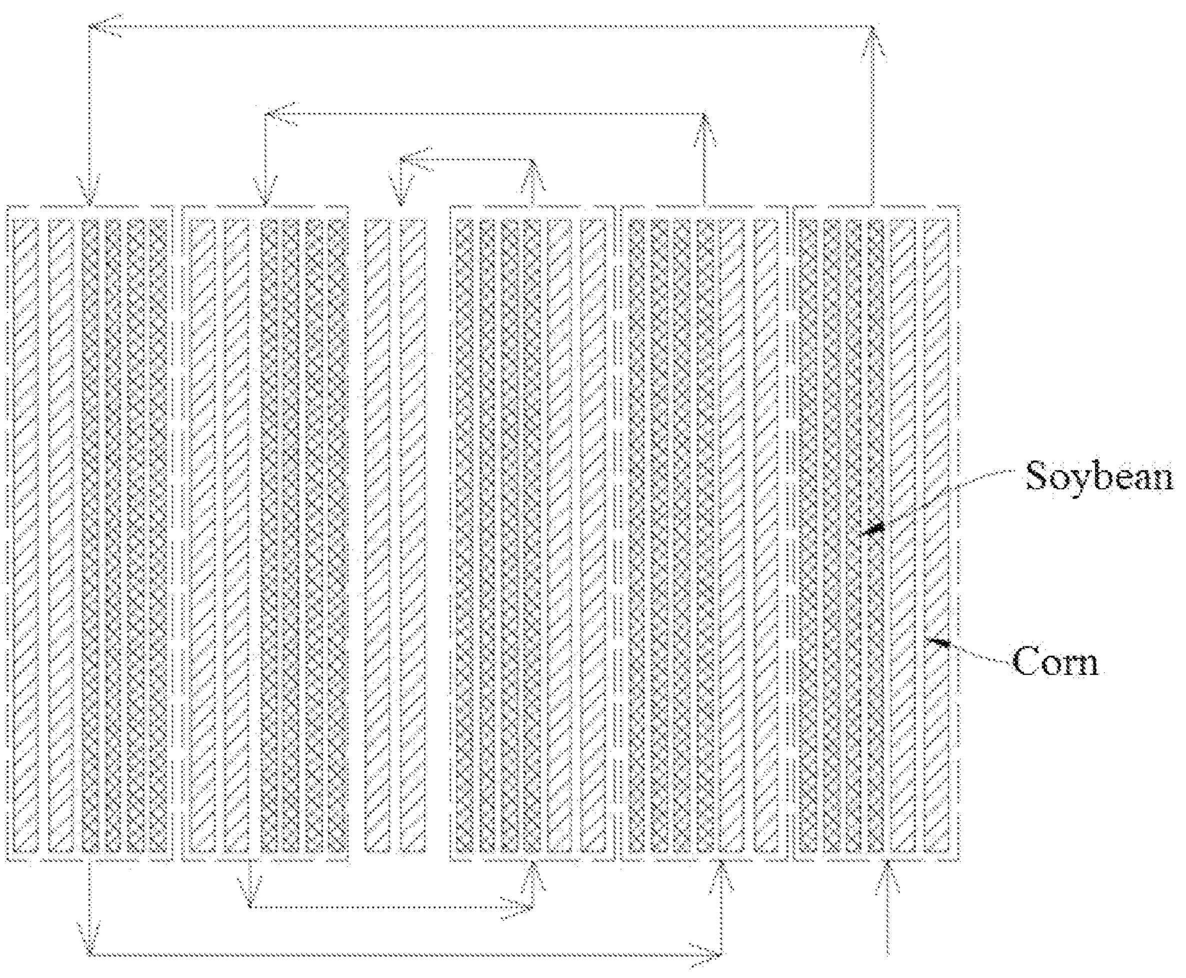
FIG. 10 is a harvesting road map of a harvesting method in one embodiment.

A dual-channel combine harvesting method suitable for soybean and corn strip compound planting is provided. As shown in FIG. 10, the method includes the following step.

(a) A combine harvester is operated to carry out multiple rounds of cyclic harvesting operations on a current operation area, in each round of harvesting operations, the combine harvester firstly harvests soybean and corn crop combination at one end of the remaining crops in the operation area, and harvests soybean and corn crop combination at the other end of the remaining crops. Each group of soybean and corn crop combinations includes m rows of soybeans and n rows of corns, and in the present disclosure, m=4 and n=2.

When the remaining crops are incapable of forming a complete soybean and corn crop combination, the remaining crops are harvested by using a corresponding cutting table in the combine cutting table portion 2 according to types of crops.

As shown in FIG. 10, the harvesting is carried out by the above-mentioned method. The combine harvester moves along the zigzag shape, and does not need to turn around frequently, which greatly facilitates harvesting and can effectively save harvesting time.

In a preferred embodiment, the crops are planted in rows in most areas in the middle of the operation area so as to form a plurality of planting rows. At least one group of crop combinations planted in columns are planted on either side of the operation area. Each group of crop combinations contains m rows of soybeans and n columns of corns. In this embodiment, m=4, and n=2. That is, on the basis of FIG. 10, at least one group of horizontal crop combinations is planted on the upper and lower sides. In this way, at harvest time, the combine harvester may first harvest at least one circle along the outer contour of the operation area (the number of harvesting circles is the same as the number of groups of crop combinations planted on each side), so as to form empty walking areas on both sides of the operation area, which is convenient for subsequent execution of the method in portion (a) above.

Figure 11:
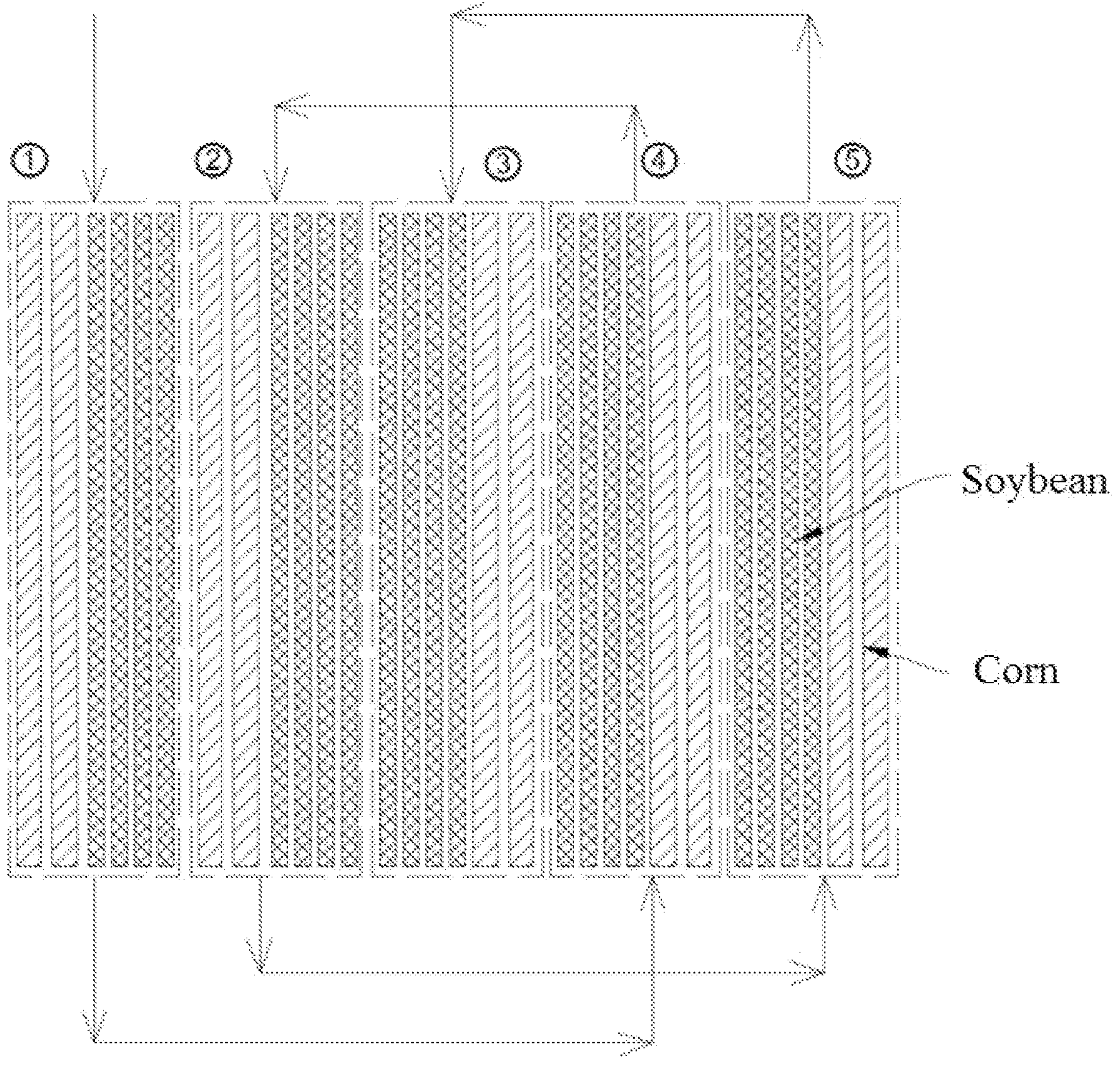
FIG. 11 is a harvest road map of the last five groups of soybean and corn combinations in a preferred embodiment.

In a preferred embodiment, when the number of soybean and corn crop combinations remaining in the operation area is less than a predetermined value, the harvesting operation according to the method in the step (a) above-mentioned is stopped, and the harvesting operation is carried out according to a new harvesting method. The rule of the new harvesting method is as follows: at least one group of soybean and corn crop combinations is separated between two adjacent harvested soybean and corn crop combinations. For example, as shown in FIG. 11, when the number of groups of soybean and corn crop combinations is more than five, the harvesting operation is carried out according to the method in the step (a) above-mentioned. The remaining five groups of soybean and corn crop combinations are numbered 1, 2, 3, 4 and 5 in sequence, and the harvesting operation may be carried out in the order of 1, 4, 2, 5 and 3, thus reducing the operation difficulty of the combine harvester.

The above is only the preferred embodiment of the present disclosure. It should be pointed out that for those skilled in the art, several improvements and modifications can be made without departing from the principle of the present disclosure. These improvements and modifications should further be regarded as the scope of protection of the present disclosure.

What is claimed is:

1. A dual-channel combine harvester suitable for strip-like compound planted soybeans and corns, comprising a mobile harvester body and a combine cutting table portion installed on the mobile harvester body;

wherein the combine cutting table portion comprises a main bracket; the main bracket is provided with a soybean cutting table and a corn picking table, the corn picking table is connected with a corn grain tank through a corn conveying device, and the soybean cutting table is connected with a soybean grain tank through a soybean conveying device;

the main bracket is rotatably installed on the mobile harvester body, and a first angle adjusting mechanism is installed between the main bracket and the mobile harvester body; wherein:

the soybean cutting table is provided with a first bracket fixed with respect to the main bracket; and the corn picking table comprises a second bracket; the second bracket is rotatably installed with respect to the main bracket, and a second angle adjusting mechanism is arranged between the second bracket and the main bracket;

wherein a corn buffer device is installed in the corn grain tank and comprises a base plate; a buffer plate is installed on the base plate, and buffer springs are installed between the buffer plate and the base plate; and wherein the corn buffer device further comprises a seat plate, a first hinged seat installed on the seat plate, and a second hinged seat installed on the base plate, a pneumatic telescopic rod is connected between the first hinged seat and the second hinged seat; and the base plate is rotatably installed with respect to the seat plate.

2. The dual-channel combine harvester suitable for strip-like compound planted soybeans and corns according to claim 1, wherein the corn picking table is configured to be disposed backwardly and upwardly with respect to the soybean cutting table.

3. The dual-channel combine harvester suitable for strip-like compound planted soybeans and corns according to claim 1, wherein the corn grain tank and the soybean grain tank are arranged from left to right.

4. The dual-channel combine harvester suitable for strip-like compound planted soybeans and corns according to claim 1, wherein the soybean cutting table comprises reels and a transverse soybean conveying auger, and the soybean conveying auger is connected with the soybean conveying device.

5. The dual-channel combine harvester suitable for strip-like compound planted soybeans and corns according to claim 1, wherein the corn picking table comprises two picking devices; each picking devices comprises two roller bodies one of which is an auxiliary feeding roller and the other is a stalk pulling roller, the two roller bodies are rotatably installed on the second bracket and arranged in parallel with each other, and a channel into which corn stalks enter is formed between the two roller bodies; pulling wheels are installed at a front end of the channel, a corn ear conveying auger transversely arranged is installed below a rear side of the channel; and a straw chopping roller is further installed below the picking device; and the two roller bodies comprised in each picking device are connected with a same transmission box which drives the two roller bodies to rotate reversely at a constant speed and is driven to rotate by a hydraulic motor.

6. The dual-channel combine harvester suitable for strip-like compound planted soybeans and corns according to claim 1, wherein the seat plate is capable of lifting and sliding with respect to the corn grain tank, and a slide guide device is arranged between the seat plate and the corn grain tank; and a driving mechanism is further arranged between the corn buffer device and the corn grain tank and comprises a gear, a rack, a gear shaft and a one-way clutch; the gear and the rack are meshed with each other and are rotatably installed with respect to the seat plate and the base plate, respectively; the one-way clutch is installed between the gear and the gear shaft; the driving mechanism further comprises a lead screw installed in the corn grain tank and a lead screw nut rotatably installed on the seat plate; and a transmission relationship is established between the gear shaft and the lead screw nut through a bevel gear set.

7. A harvesting method for a dual-channel combine harvester suitable for soybean and corn strip compound planting, wherein the dual-channel combine harvester comprises a mobile harvester body and a combine cutting table portion installed on the mobile harvester body;

wherein the combine cutting table portion comprises a main bracket; the main bracket is provided with a soybean cutting table and a corn picking table, the corn picking table is connected with a corn grain tank through a corn conveying device, and the soybean cutting table is connected with a soybean conveying device through a soybean grain tank;

the main bracket is rotatably installed on the mobile harvester body, and a first angle adjusting mechanism is installed between the main bracket and the mobile harvester body; wherein:

the soybean cutting table is provided with a first bracket fixed with respect to the main bracket; and the corn picking table comprises a second bracket; the second bracket is rotatably installed with respect to the main bracket, and a second angle adjusting mechanism is arranged between the second bracket and the main bracket;

wherein a corn buffer device is installed in the corn grain tank and comprises a base plate; a buffer plate is installed on the base plate, and buffer springs are installed between the buffer plate and the base plate;

wherein the corn buffer device further comprises a seat plate, a first hinged seat installed on the seat plate, and a second hinged seat installed on the base plate, a pneumatic telescopic rod is connected between the first hinged seat and the second hinged seat; and the base plate is rotatably installed with respect tothe seat plate; and wherein harvesting method comprises:

operating the dual-channel combine harvester to carry out a plurality of rounds of cyclic harvesting operations on a current operation area, wherein in each of the plurality of rounds of harvesting operations, the dual-channel combine harvester firstly harvests soybean and corn crop combination at one end of remaining crops in the current operation area, and harvests soybean and corn crop combination at an other end of the remaining crops;

wherein when the remaining crops are incapable of forming a complete soybean and corn crop combination, harvesting the remaining crops by using a corresponding cutting table in the combine cutting table portion according to types of crops.

* * * * *